United States Patent [19]

Stahl et al.

[11] Patent Number: 4,627,603

[45] Date of Patent: Dec. 9, 1986

[54] CLAMPING DEVICE

[75] Inventors: Bernhard Stahl, Neunkirchen; Horst Böhm, Siegen, both of Fed. Rep. of Germany

[73] Assignee: Optima Spanntechnik GmbH, Siegen, Fed. Rep. of Germany

[21] Appl. No.: 749,301

[22] Filed: Jun. 27, 1985

[30] Foreign Application Priority Data

Jul. 10, 1984 [DE] Fed. Rep. of Germany ....... 3425275

[51] Int. Cl.$^4$ .............................................. B66F 3/00
[52] U.S. Cl. .................................................... 269/32
[58] Field of Search .................... 269/27, 24, 32, 238; 74/110, 520

[56] References Cited

U.S. PATENT DOCUMENTS 3,281,140 10/1966 Smierciak .............................. 269/32
3,565,415  2/1971 Blatt ...................................... 269/32
3,941,353  3/1976 Hock ...................................... 269/32

*Primary Examiner*—Robert C. Watson

*Attorney, Agent, or Firm*—Toren, McGeady, Stanger, Goldberg & Kiel

[57] ABSTRACT

A clamping device which is arranged to clamp a workpiece to a table or stand, and which does not obstruct the clamping region of the table or stand, has a fluid pressure-loaded clamping piston slidably mounted in a main housing with toggle levers on either side thereof bearing against oppositely situated saddle bearings at the sides of the housing. The toggle levers are moved by the clamping piston between an inclined position and an extended position and load a clamping or pulling anchor which is mounted on the housing. The clamping or pulling anchor is pivotally mounted on a clamping lever so that it can swing through a maximum of 180° from a clamping position into a release position in which it is well clear of the workpiece. The anchor is fitted onto a bearing pin, which is disposed in an end, which projects from the housing, of the clamping lever which is pivotally mounted in the housing. The opposite end of the clamping lever rests against one of the saddle bearings of the toggle levers and is guided slidably in the housing.

13 Claims, 9 Drawing Figures

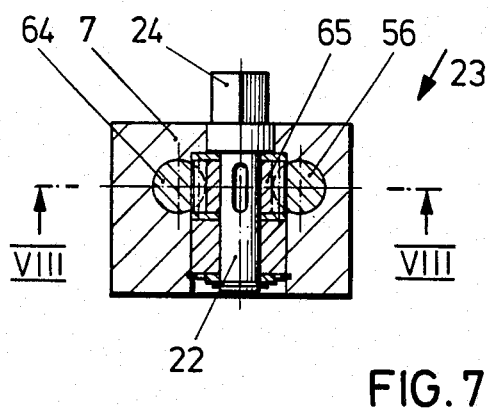
FIG. 7
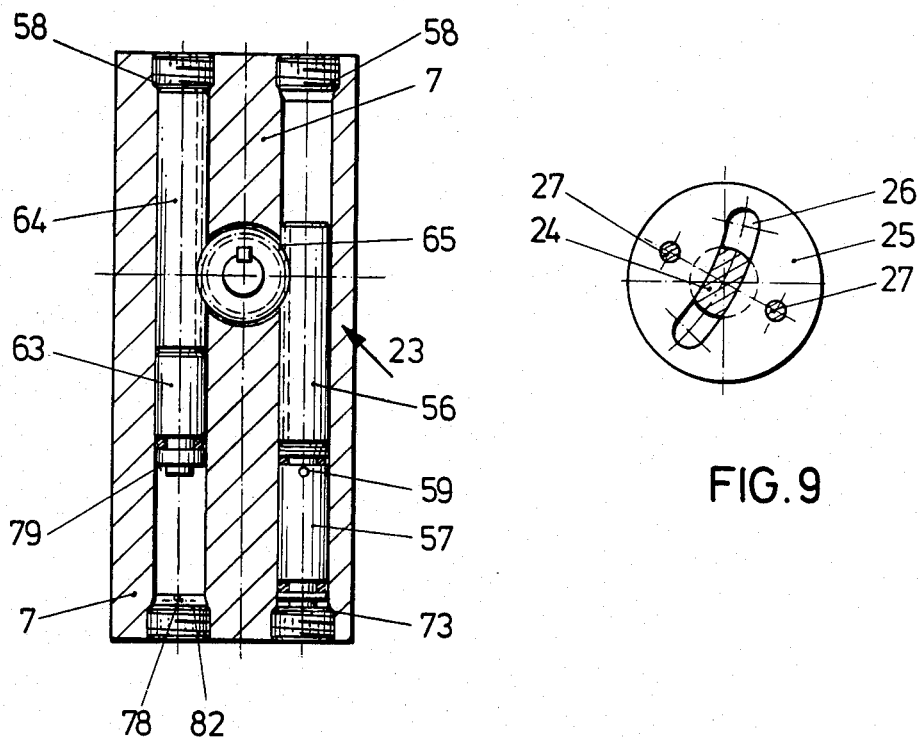
FIG. 8
FIG. 9

CLAMPING DEVICE

This invention relates to a clamping device for use, for example, in clamping a workpiece to a worktable of a machine tool, the clamping device having a clamping piston, which, in operation, is subject to fluid pressure loading and is slidably mounted in a main housing, a sliding member which is transversely slidably mounted in the clamping piston and has on both sides toggle levers which thrust in opposite directions against saddle bearings at the sides of the housing, the toggle levers each being movable by the clamping piston between a position inclined to the axis of the clamping piston and an extended position, and a clamping anchor which is mounted on the housing and is loaded by the toggle levers.

BACKGROUND OF THE INVENTION

Such a device is disclosed in German Patent specification No. 3233 940. With this known quick-acting clamping device, high clamping forces and at the same time a large axial clearance movement of the clamping anchor can be achieved, so that comparatively large idle strokes of the anchor can be achieved within a very rapid clamping and release cycle. A pressure plate on the sliding member of the toggle lever system is, for this purpose, formed as a piston and has a fluid pressure connection at its piston-side boundary surface with the pressure chamber of the clamping piston and is fluid sealed against the housing. There is thus a functional division between an initial idle stroke and a subsequent controlled clamping and locking of the clamping anchor. The clamping or pulling anchor, which is mounted upright in the housing, has a rhombus-shaped T-groove block at its free end which permanently projects to a greater or lesser extent into the clamping zone and engages, for example into T-grooves or into carriage aprons of the article to be clamped. The clamping anchor which is raised sufficiently high before clamping by means of a sliding piston, is, after it has moved into its locking position, at first so adjusted by means of a rotary mechanism consisting of two oppositely acting, piston-driven toothed racks which act in the rotational direction upon a toothed ring which is slidable axially along the clamping anchor, that the T-groove block cannot escape from its seating when the pulling anchor is pulled up, i.e. at clamping. Clamping is effected by means of the toggle lever system when the levers adopt extended positions.

The main object of the present invention is to improve a clamping device as initially described in such a way as to create a compact, robust device of small dimensions, which makes possible reliable and economical clamping, and which preferably does not have any clamping elements which, in use, extend into and obstruct the clamping region of a table or stand so that, for example, a tool changing carriage can be brought unimpededly right up to the edge of the table for the purpose of loading it.

SUMMARY OF THE INVENTION

To this end, according to this invention, a clamping device as initially described is characterised in that a clamping lever is mounted to pivot about an axis in the main housing and one end of the clamping lever, which is slidably guided in the main housing, is acted upon by one of the saddle bearings which is movable by the toggle lever in the main housing and the clamping anchor is mounted to pivot through an angle of up to 180° from a release position into a clamping position by a pivot disposed on the other end of the clamping lever which projects from the main housing.

With this arrangement, the clamping anchor which transmits the clamping force to the component to be clamped by the device can be pivoted in a very small space and, due to the compact dimensions of the main housing, may be accommodated without major modifications, for example, in the region of a pressing frame or in recesses of a table plate.

The clamping device may be arranged so that in the release position, the clamping anchor is situtated below the table plate and it is not brought into the clamping position until a tool or some other device, which may be used for example for machining work, has been positioned or unloaded onto the table or stand to which the clamping device is fixed. The pivot pin at the forward end of the lever serves predominantly as a pivot axis for the pulling anchor, whereas another shaft or pin passing transversely through the clamping lever functions as the pivot axis for the clamping lever. As soon as the toggle mechanism has been brought into its extended position, the saddle bearing, against which the end of the clamping lever rests and which optionally may also be seated by a pressure piece, is displaced upwards in the housing. In doing this the lever is pivoted about its axis, so that the forward end of the clamping lever moves downwards and thus the pulling or clamping anchor, which is swung up into its clamping position, is drawn downwards until it bears against the component to be clamped.

The clamping anchor may be pivoted to the clamping lever by a forked head, into which, for example, the anchor may be screwed. The clamping anchor may have an adjusting screw screwed onto its free end remote from the lever. By means of the adjusting screw, a clamping force from zero to a maximumm can be set according to the clearance gap between the adjusting screw and a component to be clamped. By providing interchangeable pulling or clamping anchors of different lengths, the clamping device may also be adapted to various thicknesses of the components to be clamped.

Clamping is carried out by means of the clamping piston, which is coupled by a torsion preventing device, for example a parallel keyway, with the sliding member, which may be disposed to slide radially in a recess in the clamping piston. The sliding member is preferably formed on both sides as a saddle bearing for one end of each of the toggle levers.

By means of a auxiliary cylinder, which may be mounted in the main housing and have a piston which acts on the projecting end of the clamping lever, the end of this lever remote from the pulling or clamping anchor may be brought into full contact, in the release position of the anchor, with the movable pressure piece or saddle bearing of one of the toggle levers. In this position, the forked head of the clamping anchor may actuate a limit switch, which indicates or monitors when the device is released.

A rotating mechanism having a connecting disc which is drivingly connected coaxially through a pin with one side of the forked head and which has a curved recess makes possible automatic pivoting of the anchor, so that a hydromechanical clamping device is provided. A flattened end zone of a spindle which carries a toothed wheel may engage in the recess in the connecting disc and may be acted upon by the rotating mechanism which drives the toothed wheel, and comprises at least one fluid pressure operated toothed rack. The rack may be moved by means of a piston and is oriented transversely to the toothed wheel and engages therewith. The clamping device then fulfils two functions: firstly the swinging of the pulling or clamping anchor into the clamping and release positions, and secondly the generating of the clamping force by means of the toggle lever system. In this way mechanical clamping and hydraulic actuation of the device is obtained.

A compact form of construction may be ensured by the spindle, toothed wheel and rotating mechanism being accommodated in a separate housing, which may be bolted to the main housing or to the clamping lever.

The two connected housings enable the two functions of pivoting the pulling anchor and generating the clamping force by an internal fluid control port to be constructed as a follow-up control. For this purpose the pressure chambers of two pistons acting upon two toothed racks of the rotating mechanism may be in fluid communication with the piston surfaces of the clamping piston in such a manner that the pressure chamber of one piston is in communication via a fluid pressure supply line comprising a control port with the clamping end piston surface of the clamping piston and the pressure chamber of the release end piston surface of the clamping piston is in communication via another control port and a feed line with the pressure chamber of the other rack piston. In this manner only two fluid pressure supply connections are required for clamping and for releasing of the device although several operations take place one after another.

With a prestressed compression spring acting upon the release end piston surface of the clamping piston, a safety control or monitoring of the minimum clamping force can be achieved. If a sufficient force required for pushing the toggle system into the extended position has not been developed by the fluid pressure, the prestressed spring displaces the clamping piston back into the release position.

Electrical monitoring of the safety control can be achieved by a stub, extending axially from the clamping piston in the release direction and having a switching cam fixed to it. A limit switch is associated with this cam. When the working piston is displaced in the release direction, the switching cam comes out of contact with the limit switch and generates an electrical signal.

BRIEF DESCRIPTION OF THE DRAWINGS

An example of a device in accordance with the invention is explained in more detail below with reference to the accompanying drawings in which:

FIG. 7 is a section through the housing of FIG. 5 along the line VII—VII in FIG. 6;

FIG. 8 is a section through a rotating mechanism comprising two oppositely acting, piston-driven toothed racks meshing with a toothed wheel, along the line VIII—VIII in FIG. 7; and FIG. 9 is a detail of a connecting disc with a flattened end zone of a shaft of the rotating mechanism, engaging in a recess of the disc.

DESCRIPTION OF THE PREFERRED EMBODIMENT

Figure 1:
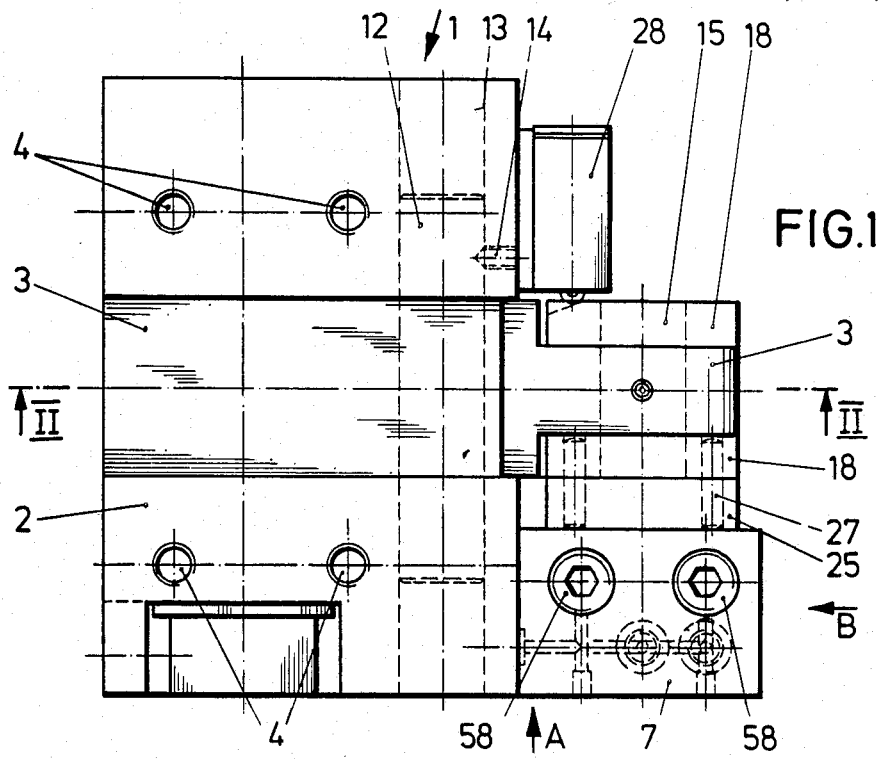
FIG 1 is a plan view of the device.
Figure 3:
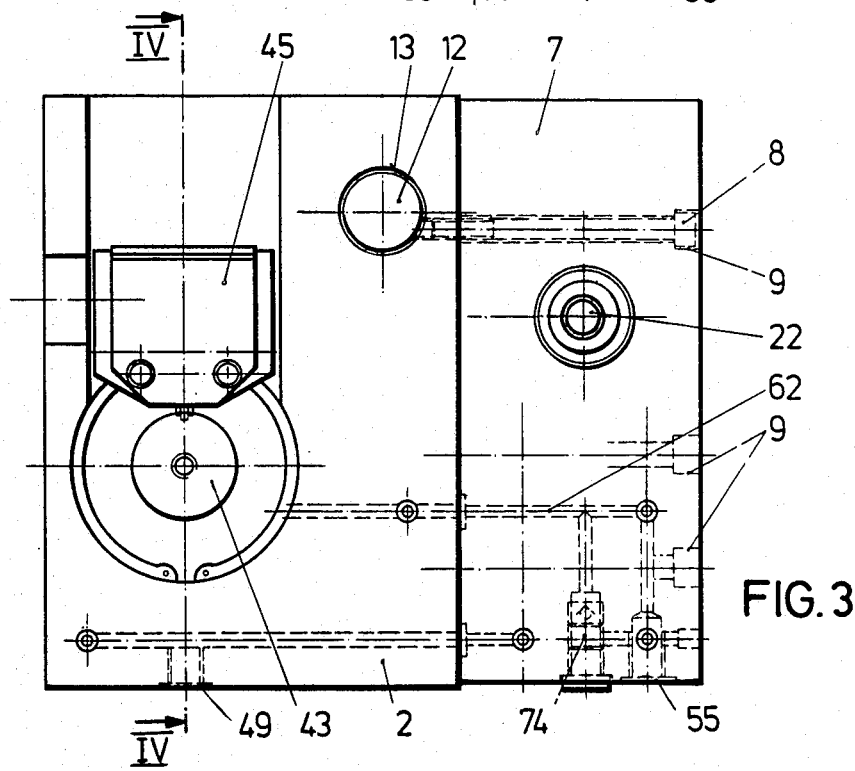
FIG. 3 is an elevation of the clamping device in the direction of arrow A in FIG. 1.

The clamping device 1 comprises a main housing 2 and a clamping lever 3 which is disposed in the housing 2 and projects at one end beyond the housing 2. At the top in the housing, there are threaded bores 4, by which the housing can be bolted (FIG. 2) by means of bolts 5 to a table or stand 6 of a machine tool, which is not illustrated. To the main housing 2 there is also bolted a separate housing 7 by means of fixing bolts 8, which are inserted through spaced apart bores 9 in the housing 7 and are screwed into the main housing 2 (FIG. 3). The basically rectangular block of the housing 7 fits flush against one face of the main housing 2.

The clamping lever 3 is pierced, in the transverse direction, by two pivot shafts of which one shaft 12 is inserted into a bore 13 passing through the main housing 2 and is secured by a screw threaded pin 14. The clamping lever 3 rocks about the shaft 12. The second shaft 15 passes through a projecting head end of the clamping lever 3 and serves as a pivot for a clamping or pulling anchor 16, which is screwed at one end into a screw threaded bore 17 of a forked head 18 and is secured by a grub screw 19. The shaft 15, passing through the two fork arms of the fork head 18 and the clamping lever 3, extends coaxially with a spindle 22 of a rotating mechanism 23, to be described in greater detail later, for the automatic swinging of the pulling anchor 16 through 180° out of a release position into a clamping position.

The spindle 22 has, for this purpose, a flattened end zone 24 which engages in a connecting disc 25, inserted between the forked head 18 and the housing 7. The disc 25 possesses for this purpose a curved recess 26. Set pins 27 ensure accurate positioning of the disc 25 relative to the forked head 18. The forked head 18 cooperates with a limit switch 28, which indicates the release position of the pulling anchor 16.

In the axial direction of the shaft 12 and the shaft 15, there is also situated in the housing 2 a clamping piston 29, having a transversely sliding member 33 which is disposed therein and is slidably coupled to the piston 29 by a parallel key 32 acting as a torsion preventing means. The sliding member 33 is constructed, on both sides transversely to the direction of movement of the piston, as saddle bearings 34 which seat the ends of toggle levers 35 of a toggle lever system for loading the pulling anchor 16. The other end of one toggle lever 35 is seated in a fixed saddle bearing 36 and the other end of the other lever seats in a saddle bearing 37 which is movable in the main housing 2 and is enclosed by a pressure piece 38. The rear end, that is the end remote from the pulling anchor 16, of the clamping lever 3 rests against the pressure piece 38, so that when the toggle levers 35 move from the inclined positions shown in FIG. 4 into an extended position, the rear end of the clamping lever 3 is raised in the housing 2 by the pressure piece 38 and the clamping lever thus turns about the shaft 12. Consequently, the projecting end of the clamping lever 3 moves downwards as seen in FIG. 2.

Figure 6:
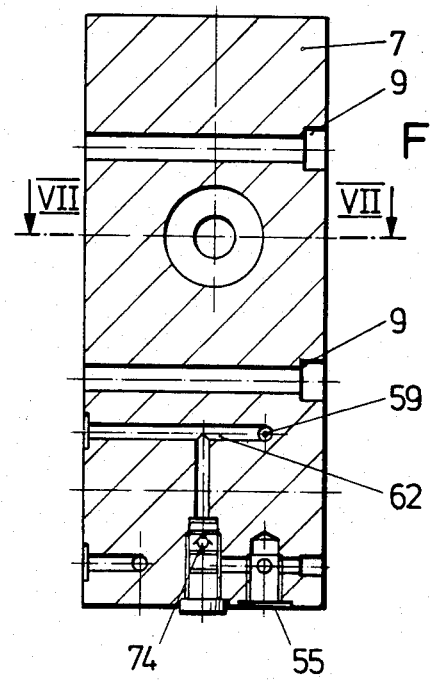
FIG. 6 is a section through the housing of FIG. 5 along the line VI—VI in FIG. 5.

The clamping piston 29 has at its pressure or clamping end surface 39, a stub-shaped extension 42 projecting out of the housing 2. A switching cam 43 is screwed into the extenxion 42 and can be adjusted and held in position by a lock nut 44. The switching cam 43 actuates, when the toggle levers 35 are extended, a limit switch 45. The piston 29 is loaded, at its release end surface 46, by a compression spring 48 disposed in a pressure chamber 47 of the piston 29. A fluid pressure release connection 49 in the main housing 2 leads to the piston surface 46 and the pressure chamber 47, the wall of which has an edge control port 53 leading into a line 54. The pressure-side piston surface 39 is supplied with pressurized hydraulic fluid via a pressure connection 55 (FIG. 6), which is located in the separate housing 7 bolted to the main housing 2. The pressurized fluid can pass to the clamping piston surface 39 only when a toothed rack 56 of the rotating mechanism 23 (see FIG. 8) has been moved by a hydraulic piston 57 as far as an abutment surface 58 of the housing 7 and exposes a control port 59, so that the fluid can flow via a feed line 62 to the piston surface 39.

The rotating mechanism comprises two oppositely acting toothed racks 56, 64, moved by pistons 57, 63, which each act according to their direction of loading upon a toothed wheel 65, which is operatively keyed and connected with the spindle 22. The racks 56, 64 thus pivot the pulling anchor 16 either into its release position shown in full lines in FIG. 2 or into its clamping position shown in chain-dotted lines.

Figure 2:
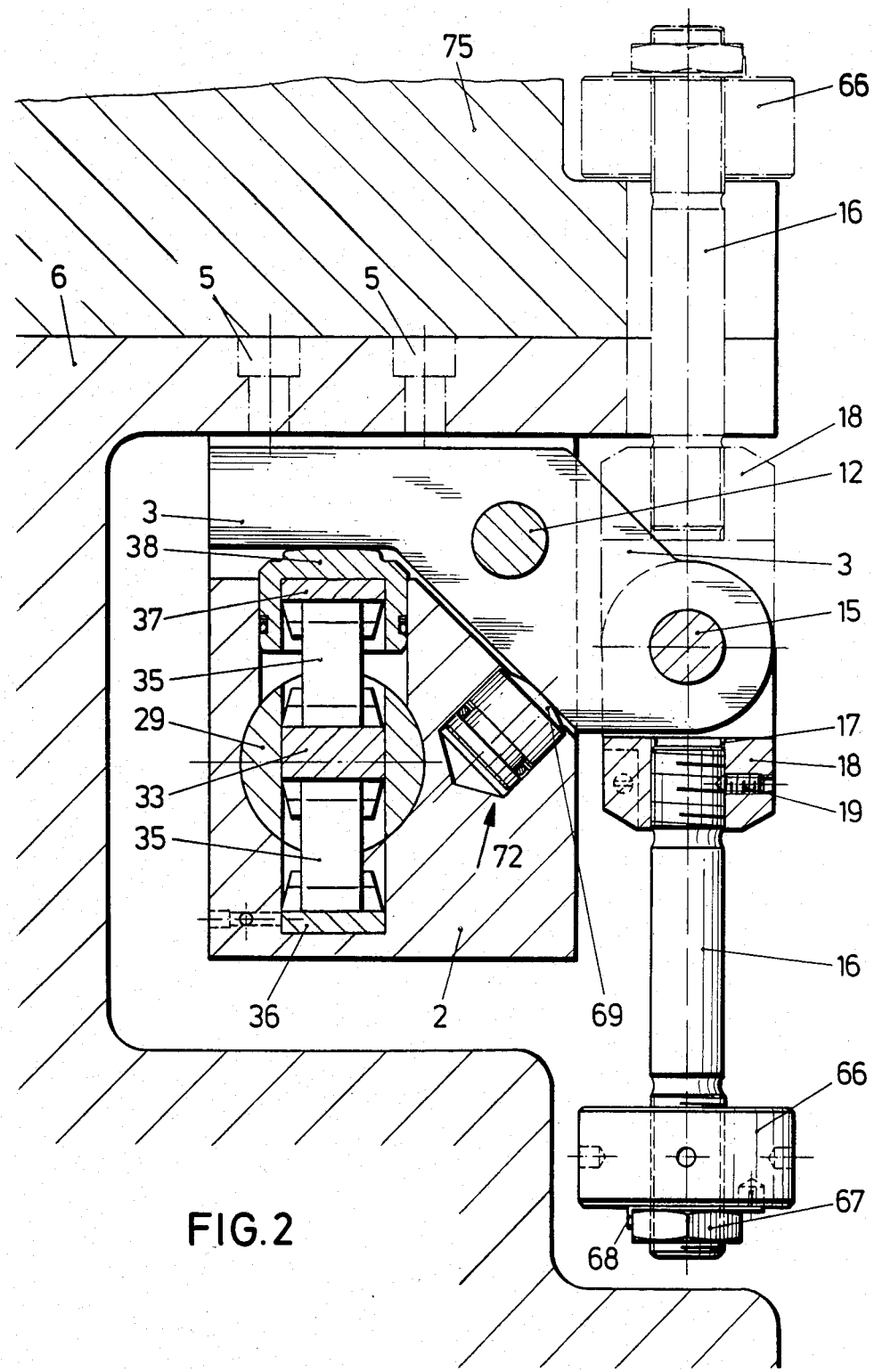
FIG. 2 is a section through the clamping device along the line II—II in FIG. 1.

The starting position of the clamping device 1 is shown in FIG. 2. The device 1 is fixed underneath the table or stand 6 of a machine tool, not shown, by means of the bolts 5 which are screwed into the screw threaded bores 4 in the main housing 2. The pulling anchor 16, on the head end of which an adjusting screw 66 is screwed and is fixed by a lock nut 67 and a securing plate 68, is situated in the downwardly pivoted, release position. The part of the clamping lever 3 which is guided in the main housing 2 rests upon the movable pressure piece 38 of the saddle bearing 37, and the forward part of the clamping lever 3 is loaded by an auxiliary piston 69 of an auxiliary fluid pressure cylinder 72 which is mounted obliquely in the main housing 2. As soon as pressurized hydraulic fluid passes via the pressure connection 55 in the housing 7 to the piston surface 73 of the hydraulic piston 57, the piston 57 displaces the toothed rack 56 of the rotating mechanism 23 in the housing 7. The toothed wheel 65 which drives the spindle 22, is thereby rotated. The spindle 22, the flattened end zone 24 of which engages in the recess 26 of the connecting disc 25, therefore also rotates and, since the connecting disc 25 is connected to the forked head 18, the disc 25 and the forked head 18 also rotate. This rotation causes rotation of the pulling anchor 16 about the shaft 15 so long as the piston 59 is pressurized or until the toothed rack 56 comes into contact with a stop 58 of the housing 7. The pulling anchor 16 which is thus pivoted through 180°, now adopts the clamping position shown in chain-dotted lines in FIG. 2.

Figure 4:
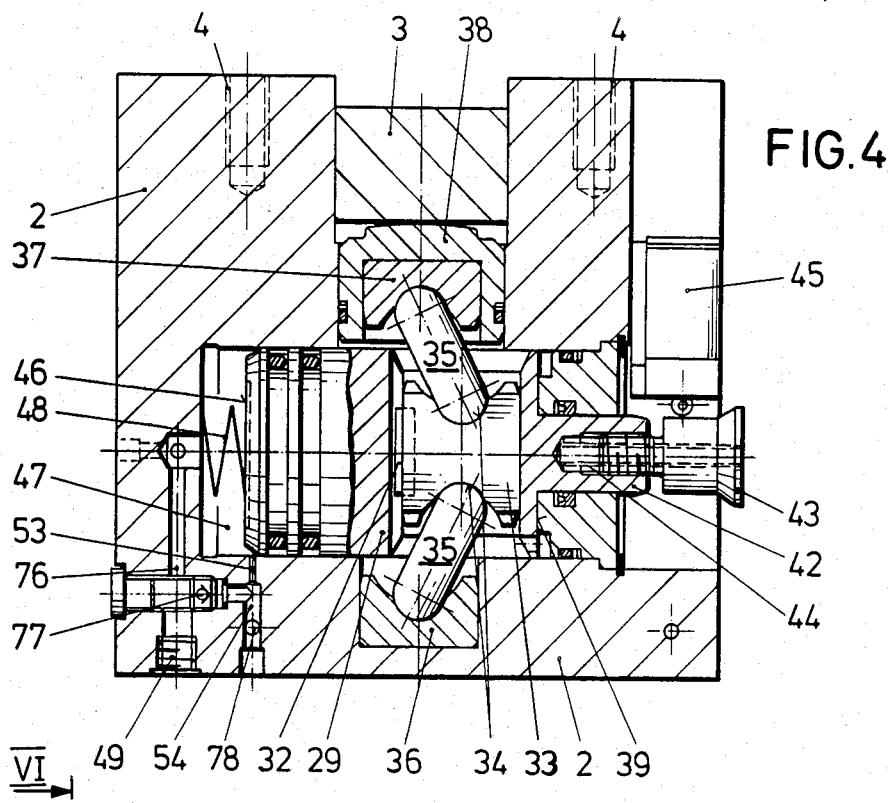
FIG. 4 is a section through the clamping device along the line IV—IV in FIG. 3.
Figure 5:
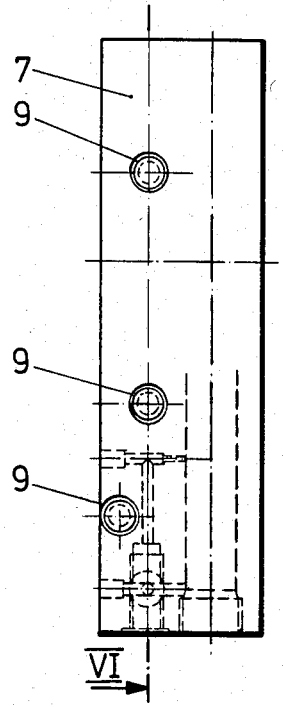
FIG. 5 is an elevation of a separate housing forming part of the device as seen in the direction of arrow B in FIG. 1.

When the piston 57 has pushed the toothed rack 56 fully up to the stop 58, the control port 59 in the cylinder space of the hydraulic piston 57 is exposed. The hydraulic fluid which is supplied via the clamping connection 55 and is fed onwards via an intermediate non-return valve 74 and a line 62, flows to the pressure or clamping piston surface 39 of the clamping piston 29 in the main housing 2 (FIG. 4). Consequently, the piston 29 moves out of its position shown in FIG. 4 to the left and thus moves the toggle levers 35 in the saddle bearings 36, 37 into a straight, i.e. extended position. The movement thus produced of the saddle bearing 37 is transmitted via the pressure piece 38, enclosing the saddle bearing 37, to the clamping lever 3, which rotates about the shaft 12, causing the projecting forward end of the lever 3 together with the pulling anchor 16 pivoted thereto to move almost vertically downwards as seen in FIG. 2. The adjusting screw 66 of the pulling anchor 16 thus bears against a tool or device 75 and presses the tool or device 75 against the table or stand 6 into a fully clamped position (FIG. 2). In this position, the switching cam 43 actuates the limit switch 45 which indicates that the clamping device is in the clamped position.

To release the pulling anchor 16, hydraulic fluid is supplied to the release-side piston surface 46 of the clamping piston 29 via the release fluid connection 49 and a connecting line 76 containing a non-return valve 77. The piston 29 thus moves into the position shown in FIG. 4 and exposes the control port 53, so that the hydraulic fluid can enter, via the line 54, a feed line 78 which conducts the fluid to the piston surface 79 of the piston 63 of the rotating mechanism 23, which at this instant is bearing against an abutment surface 82 in the housing 7. The piston 63 displaces the toothed rack 64 into the position shown in FIG. 8 and thereby rotates the toothed wheel 65, the spindle 22, the disc 25 and the forked head 18 with the pulling anchor 16 back into the release or starting position of FIG. 2. The release position is monitored and indicated by the limit switch 28 which is operated by the forked head 18.

We claim:

1. In a clamping device for clamping a workpiece in position, said clamping device including a main housing, a clamping piston slidable in said housing, means for subjecting said clamping piston to fluid under pressure, a sliding member, means transversely slidably mounting said sliding member in said clamping piston, toggle members co-operating with said sliding member, saddle bearings at the sides of said main housing, said toggle levers extending between said sliding member and said saddle bearings on both sides of said sliding member, each of said toggle levers being movable by said clamping piston between a position inclined to the axis of movement of said clamping piston and an extended position, a clamping anchor, means mounting said clamping anchor on said housing and means for loading said clamping anchor from said toggle levers, the improvement comprising a clamping lever, means mounting said clamping lever to pivot about an axis in said main housing, means slidably guiding one end of said clamping lever in said main housing, means movably mounting one of said saddle bearings in said main housing for movment by one of said toggle levers, said movably mounted saddle bearing acting upon said one end of said clamping lever, and pivot means pivotally mounting said clamping anchor on the other end of said clamping lever for pivotal movement through an angle of up to 180° from a release position into a clamping position, said other end of said clamping lever projecting from said main housing.

2. A clamping device as claimed in claim 1, wherein said means pivotally mounting said clamping anchor on the other end of said clamping lever includes pin means extending through said lever, a forked head pivoted on said pin means and means fixing said clamping anchor to said forked head.

3. A clamping device as claimed in claim 1, further comprising adjusting screw means on the end of said clamping anchor remote from said clamping lever.

4. A clamping device as claimed in claim 1, wherein said means slidably mounting said sliding member in said clamping piston includes torsion preventing means preventing said sliding member from turning relative to said clamping piston.

5. A clamping device as claimed in claim 4, further comprising means defining an opening in said clamping piston and said sliding member being disposed in said opening.

6. A clamping device as claimed in claim 1, further comprising an auxiliary fluid pressure cylinder in said main housing, an auxiliary piston in said auxiliary cylinder and said auxiliary piston being engageable with said clamping lever to pivot said clamping lever to pivot said clamping lever in a direction opposite to that in which said lever is pivoted by said toggle lever.

7. A clamping device as claimed in claim 2, further comprising a connecting disc, means drivingly connecting said connected disc to said forked head coaxially with said pin means, means defining a curved recess in said disc, a spindle, a flattened portion on said spindle, said flattened portion engaging in said curved recess, a toothed wheel fixed on said spindle and a rotating mechanism operatively connected to said toothed wheel to rotate said toothed wheel and this said spindle, said disc, said forked head and said clamping anchor to effect pivotal movement of said clamping anchor between said release position and said clamping position, said rotating mechanism including at least one toothed rack, means mounting said toothed rack transversely to said toothed wheel, said toothed rack meshing with said toothed wheel and a fluid pressure-operated piston acting on said rack to move said rack and rotate said toothed wheel.

8. A clamping device as claimed in claim 7, further comprising a separate housing and means fixing said housing to one of said main housing and said clamping lever, said separate housing containing said spindle, said toothed wheel and said rotating mechanism.

9. A clamping device as claimed in claim 7, wherein said rotating mechanism includes two toothed racks and two pistons acting on said toothed racks, and further comprising means defining pressure chambers of said two pistons and fluid pressure means communicating said pressure chambers of said two pistons one with each of two end surfaces of said clamping piston.

10. A clamping device as claimed in claim 9, wherein said pressure chamber of one of said two pistons is communicated with a clamping-side end face of said clamping piston by means of a feed line, said feed line including a control port and the other pressure chamber of the other of said two pistons is communicated with a release-side end surface of said clamping piston by means of a further fluid pressure feed line including a further control port.

11. A clamping device as claimed in claim 1, further comprising pre-stressed spring means acting upon said clamping piston and biasing said piston in a release direction in which said clamping piston moves said toggle levers towards said position inclined to said axis of movement of said clamping piston.

12. A clamping device as claimed in claim 1, further comprising stub means extending from said clamping piston in a direction in which said clamping piston moves to move said toggle levers towards said position inclined to said axis of movement of said clamping piston, switching cam means, screw-threaded means mounting said switching cam means on said stub means, and a limit switch, said limit switch being operated by said switching cam means when said clamping piston reaches a position in which said toggle levers are moved into said extended position.

13. A clamping device as claimed in claim 2, further comprising limit switch means and means mounting said switch means for contact with and operation by said forked head when said clamping anchor is pivoted into said release position.

* * * * *